United States Patent Office 3,465,053
Patented Sept. 2, 1969

3,465,053
PROCESS FOR THE MANUFACTURE OF TRANS-2-CHLOROBUTENE-(2)
Kurt Sennewald and Wilhelm Vogt, Knapsack, near Cologne, and Herbert Baader, Hermulheim, near Cologne, Germany, assignors to Knapsack Aktiengesellschaft, Knapsack, near Cologne, Germany, a corporation of Germany
No Drawing. Filed June 22, 1965, Ser. No. 466,119
Claims priority, application Germany, July 15, 1964, K 53,477
Int. Cl. C07c 17/08
U.S. Cl. 260—654        4 Claims

ABSTRACT OF THE DISCLOSURE

A process whereby trans-2-chlorobutene-(2) is obtained by reacting butyne-(2) with concentrated hydrochloric acid at a temperature of about 16–28° C.

---

2-chlorobutene-(2) is an important starting product for making 2-chlorobutadiene-(1,3). It is known that mixtures of cis- and trans-2-chlorobutenes-(2) can be prepared from 2,3-dichlorobutane with the help of a $BaCl_2$/active carbon catalyst, or by the splitting off of HCl by means of a base.

Pure trans-2-chlorobutene-(2) can be obtained from a cis-trans-mixture by the addition of an alcohol, preferably ethanol, followed by azeotropic distillation and scrubbing of the alcohol with water. The pure trans-compound boils at 62.84° C. (760 mm. mercury) while the pure cis-compound boils at 70.6° C. (760 mm. mercury).

Apart from the complicated distillation entrained by the addition of an alcohol, a further disadvantage associated with conventional processes resides in the fact that the 2-chlorobutene-(2) can merely partially be obtained in the form of the pure trans-compound as all previous attempts for rearrangement of cis-2-chlorobutene-(2) into trans-2-chlorobutene-(2) have failed.

It has now been found that the difficulties mentioned above can be obviated in accordance with the present invention which comprises transforming by splitting off HCl a 2-chlorobutene-(2) cis-trans-mixture or 2-chlorobutene-(2) enriched with the cis-compound into butyne-(2) and additively combining the butyne-(2) with HCl.

The process of the present invention unexpectedly permits very pure trans-2-chlorobutene-(2) to be prepared by the additive combination of HCl with butyne-(2) in the presence of a polar solvent for the hydrogen chloride, preferably in the presence of water. On the other hand, no such reaction was observed on introducing dry hydrogen chloride into butyne-(2). For example, concentrated hydrochloric acid and butyne-(2) are mixed with one another at room temperature to effect the additive combination with HCl. It is necessary to intensely stir the mixture as both butyne-(2) and 2-chlorobutene-(2) have a very limited solubility in hydrochloric acid. On mixing the two phases, the temperature increases up to the boiling point of butyne-(2) (28° C.) to again drop to room temperature once the reaction is complete. The aqueous and organic phases are separated from one another, and the organic phase is distilled to recover practically pure trans-2-chlorobutene-(2) (boiling point: 62:84° C.) in addition to unreacted butyne-(2).

It is an unexpected result that the process of the present invention produces almost exclusively the trans-compound of 2-chlorobutene-(2). Only unimportant traces of the cis-compound can be detected in the organic phase by gas-chromatographical means. Even under a slight HCl pressure is the reaction arrested at the 2-chlorobutene-(2)-stage and it does not proceed to the 2,2-dihalogeno-compound stage as obtained by the additive combination of HBr of HF with butyne-(2).

The manufacture of trans-2-chlorobutene-(2) by the process of the present invention also incurs considerable technical advantages. Butyne-(2) which is obtained as a by-product, e.g., in the preparation of butadiene-(1,3) from butane, can in this manner be transformed into a valuable starting product for making 2-chlorobutadiene-(1,3). The fact that substantially trans-2-chlorobutene-(2) is formed alone incurs a further advantage because the trans-compound is more suitable than the cis-compound for transforming 2-chlorobutene-(2) into 2-chlorobutadiene-(1,3). Also in reactions other than described above in which the 2-chlorobutene-(2) was involved, it was found that the trans-compound has a reactivity substantially greater than that of the cis-compound. Also for this reason, it is an unexpected result that the process of the present invention leads to the formation of the trans-compound.

The trans-compound as compared with the cis-trans-mixture (boiling range: 62–71° C. under a pressure of 760 mm. Hg) has a defined boiling point, i.e., of 62.84° C. under a pressure of 760 mm. Hg, and separation of the 2-chlorobutene-(2) from other substances by distillation is therefore easier to achieve under well defined conditions.

The present invention provides more especially a process for the manufacture of trans - 2 - chlorobutene - (2), which comprises reacting, while intensely mixing, butyne-(2) with aqueous hydrochloric acid and then separating and distilling organic phase in conventional manner. Concentrated, preferably an about 36% aqueous hydrochloric acid has proved especially suitable for this. The reaction is conveniently carried out at temperatures of about 16 to 28° C., and the butyne-(2) is generally mixed with the hydrochloric acid for a period of time of 2 to 8, preferably 4 to 6 hours.

The following examples illustrate the process of the present invention.

EXAMPLE 1

29 grams butyne-(2) (B.P.: +28° C.) and 175 cc. concentrated hydrochloric acid (about 36% by weight) were stirred for 6 hours. The temperature initially rose from 20 to 27° C. ad then dropped to 20° C. The organic phase (36 grams) was separated from the aqueous phase and distilled. The organic phase consisted of 23.7 grams trans-2-chlorobutene-(2), 0.1 gram cis-2-chlorobutene-(2) and 11.7 grams unreacted butyne-(2). The conversion rate was 60% and the yield as 81%, calculated on the butyne-(2) which underwent conversion.

EXAMPLE 2

The experiment described in Example 1 was repeated in a shaking apparatus under a HCl pressure of 140 mm.

mercury. The reaction was complete after 4 hours. The rate of conversion was 56.5% and trans-2-chlorobutene-(2) was obtained in a yield of 79%, calculated on the butyne-(2) which underwent conversion.

We claim:

1. A process for the manufacture of trans-2-chlorobutene-(2) which comprises reacting, while intensely mixing, butyne-(2) with concentrated hydrochloric acid at temperatures of about 16–28° C., separating organic phase and distilling the organic phase.

2. A process as claimed in claim 1, wherein about 36% aqueous hydrochloric acid is used.

3. A process as claimed in claim 1, wherein butyne-(2) is mixed with hydrochloric acid for a period of about 2 to 8 hours.

4. A process as claimed in claim 3, wherein the butyne-(2) is mixed with the hydrochloric acid for a period of 4 to 6 hours.

References Cited

UNITED STATES PATENTS

| | | | |
|---|---|---|---|
| 2,522,687 | 9/1950 | Padgitt et al. | 260—663 |
| 2,945,897 | 7/1960 | Eisenlohr | 260—663 |
| 2,991,316 | 7/1961 | Disselnkötter et al. | 260—654 |
| 3,059,034 | 10/1962 | Prez | 260—663 X |

DANIEL D. HORWITZ, Primary Examiner

U.S. Cl. X.R.

260—654